Oct. 21, 1924.
S. G. CRANE
ADVERTISING SCALE
Filed Nov. 21, 1919
1,512,161
3 Sheets-Sheet 2
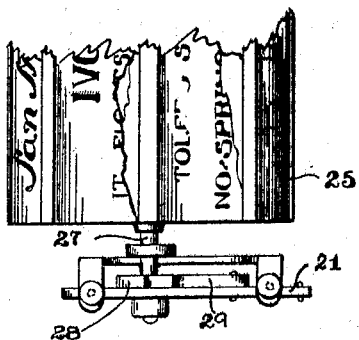
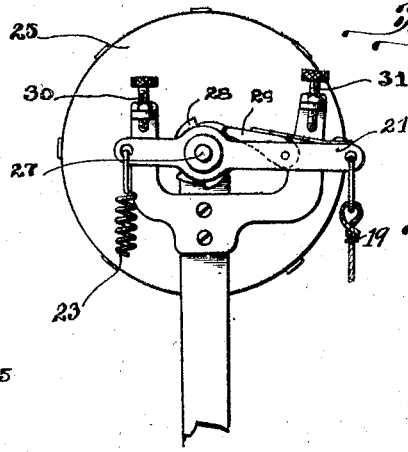
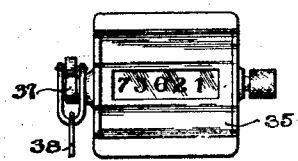
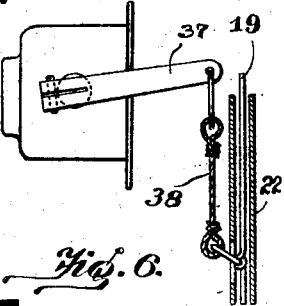
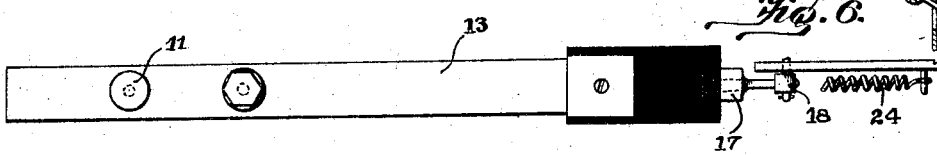
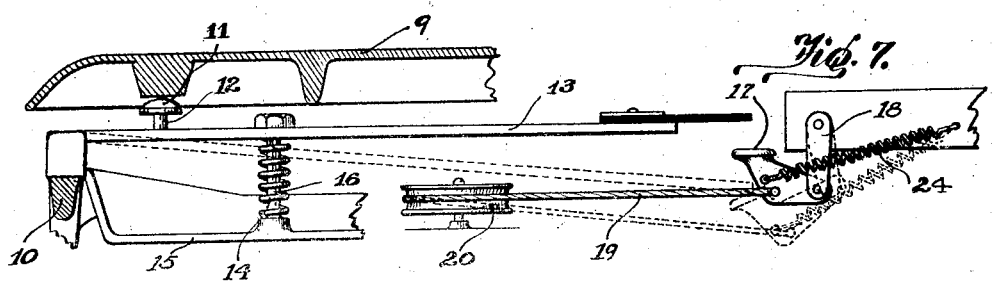
Witness
C. E. Wilcox
Inventor
Samuel G. Crane
By George R. Frye
Attorney

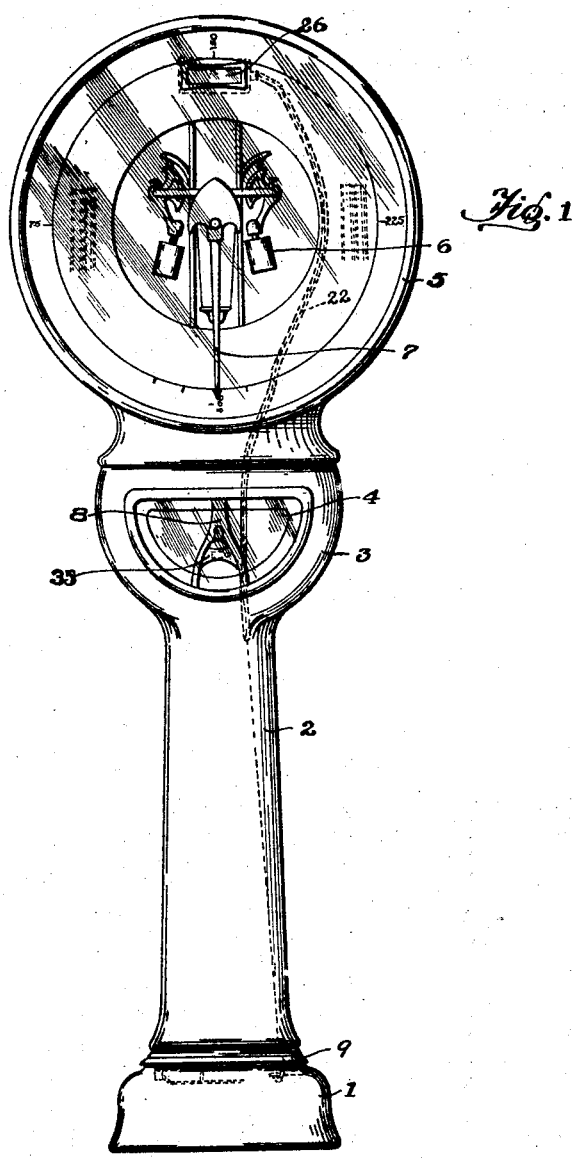

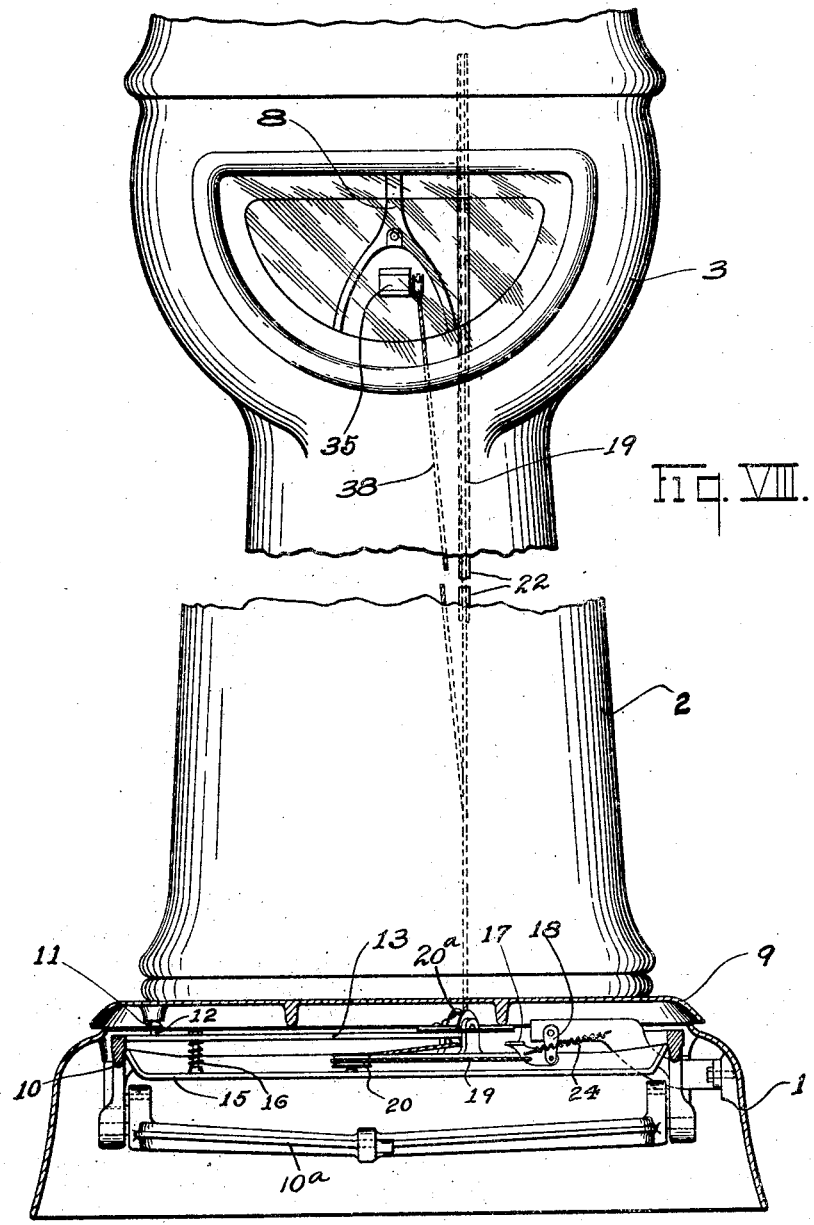

Patented Oct. 21, 1924.

1,512,161

UNITED STATES PATENT OFFICE.

SAMUEL G. CRANE, OF TOLEDO, OHIO, ASSIGNOR TO TOLEDO SCALE COMPANY, OF TOLEDO, OHIO, A CORPORATION OF NEW JERSEY.

ADVERTISING SCALE.

Application filed November 21, 1919. Serial No. 339,682.

*To all whom it may concern:*

Be it known that I, SAMUEL G. CRANE, a citizen of the United States, residing at Toledo, in the county of Lucas and State of Ohio, have invented certain new and useful Improvements in Advertising Scales, of which the following is a specification.

This invention relates to advertising devices operated in connection with and auxiliary to other mechanism, and I have illustrated as a preferred embodiment thereof a weighing scale, to use with which the advertising mechanism is particularly adapted. It is to be understood, however, that the advertising device forming a feature of this invention is also adapted for use with other machines, such, for example, as vending machines, cash registers, etc., and that I contemplate the use of the advertising device wherever applicable.

One of the objects of this invention is to provide an advertising device operated as an auxiliary to a scale or other machine in which the character of the advertisement is changed with each operation of the machine.

Another object is to provide means for illuminating such an advertisement during the operation of the machine.

Another object is the provision of a changeable advertising device and an illuminating device therefor, and means for changing said advertising device at the beginning of a weighing operation of the scale and for continuing the illumination during the entire weighing operation.

Other objects and advantages will be apparent from the following description in which reference is had to the following drawings illustrating a preferred embodiment of my invention and in which similar reference numerals designate similar parts throughout the several views.

In the drawings:—

Figure 1 is a front elevation of the scale embodying my invention.

Figure 2 is a fragmentary elevation of an advertising reel forming a feature of my invention.

Figure 3 is an end elevation of the advertising reel showing part of the operating mechanism.

Figure 4 is a front elevation of a counter forming part of the combination of my invention.

Figure 5 is an end elevation of the same.

Figure 6 is a plan view of a lever forming an element of my invention.

Figure 7 is a fragmentary sectional view of the scale platform and the parts operated thereby.

Figure 8 is an elevational view, partly in section, with parts broken away, of a weighing scale embodying my invention, some of the details of the mechanism being slightly modified.

I have shown my invention as applied to a scale of the type known as a person weigher, to which, because of its advertising nature, it is particularly adapted. My invention, however, does not reside in the weighing mechanism per se, and so the scale will be described only with such particularity as will suffice to clearly show the connection of the other elements of the invention therewith.

As shown, the scale base 1 is comparatively small so that several persons cannot stand upon the scale at the same time. Secured to the base 1 and extending upwardly from the rearward end thereof is a hollow column 2. The upper end of this column is flared as at 3 and provided with front and rear windows 4. Supported upon the flared upper end of the column 2 is a substantially watch casing shaped housing 5 having a crystal in its forward side which displays the load-offsetting mechanism of the scale. The load-offsetting mechanism shown is substantially the automatic pendulum type described and claimed in U. S. patent to Hapgood No. 1,203,611, dated November 7, 1916. It consists of a pair of oppositely swinging pendulums 6 which swing outwardly and upwardly to offset the load on the scale. The pendulum mechanism is suitably connected to an indicator hand 7 which indicates the load offset upon the dial displayed through the face of the housing 5. From the pendulum mechanism a connection 8 extends downwardly through the column 2 to the platform lever mechanism 10ª.

The platform 9 is carried by a spider 10 which is supported upon the platform lever mechanism. The platform 9 is not, however, immovably secured to the spider as is usually the case in scales of this type but is slightly movable up and down relative thereto. When there is no weight on the scale one side of the platform is supported upon a round head 11 of the pin 12 which projects upwardly from a lever 13 pivoted at one side of the platform spider. The lever 13 is normally held in the position shown in full lines in Figure 7 by means of a spring 14 which is supported upon a cross bar 15 of the platform spider 10. The spring 14 is held in position by means of a pin 16 secured to the lever 13 and passing through an opening in the cross bar 15 or vice versa. When a person steps upon the platform the pin 12 forces the lever 13 downwardly to the position shown in dotted lines in Figure 7, compressing the spring 14 until the platform engages the spider 10.

As the lever 13 swings downwardly it engages a member 17, pivotally suspended from the platform spider by means of a link 18, and causes the member 17 to swing downwardly and rearwardly to the position shown in dotted lines in Figure 7. A cable 19 is fastened at one end to the member 17 and takes over the pulleys 20 and 20ª mounted on the platform spider and then passes upwardly through the column 2 to a connection with a lever 21 mounted in the upper part of the housing 5. The portion of the cable which passes upwardly through column 2 and housing 5 may be enclosed in a rigid tube extending substantially as shown in dotted lines at 22 in Figure 1, or it may be passed over a system of pulleys in the manner indicated in Figure 8 to give it the proper direction.

The end of the lever 21 opposite to its connection with the cable 19 is connected to a retractile spring 23 which holds the cable taut. A retractile spring 24 connected to the member 17 prevents the member 17 from being pulled out of place by the cable 19. As the platform is depressed and the lever 13 swings downwardly, the member 17 is pressed laterally and pulls upon the cable 19. The lever 21 is thus rocked against the tension of the spring 23. Since the load upon the spider end and hence upon the platform lever mechanism is as great as though the platform 9 rested solidly upon ths spider in the first place, it is evident that tensioning the spring 23 does not noticeably affect the operation of the weighing mechanism.

The energy thus stored in the spring 23 is used to operate an advertising device consisting of a reel 25 carrying a series of advertisements which are displayed in rotation at a window 26 in the upper part of the housing 5. The reel 25 is mounted upon a shaft 27, one end of which forms the fulcrum of the lever 21. Fixed upon the shaft 27, between the reel 25 and the lever 21, is a ratchet 28 and pivoted upon the lever 21 is a spring-pressed pawl 29 which co-operates with the ratchet 28. The teeth of the ratchet are so turned that the pawl slides over them as the lever is rocked by a downward pull on the cable 19. When the platform 9 is allowed to rise and the lever 21 is rocked by the contraction of the spring 23, the pawl 29 engages the ratchet 28 and turns the reel sufficiently to display a fresh advertisement at the window 26. Stop screws 30 and 31 are provided to limit the rocking movement of the lever 21.

The operation of the advertising device is thought to be apparent from the foregoing description of the mechanism. As the advertisement is displayed in the dial of the scale, it is likely to attract the attention of one as he reads his weight. As the person steps off the scale the advertisement changes, thus again attracting the attention of the person who has just used the scale as well as that of the passer-by.

As a basis for fixing a proper charge for the advertising service furnished by any particular scale, and for other reasons, it is desirable to know, approximately, the number of persons using the scale daily. For the purpose of automatically making a record of the operations of the scale I have provided a counter 35 which is mounted in the flaring upper end 3 of the column 2, so as to be readable through the rear window 4. The interior mechanism of the counter 35 is not of my invention so I have not illustrated it in detail. I have adopted, for illustrative purposes, a counter of the well-known Veeder type. An arm 37 is fixed to a shaft projecting from the case of the counter and is connected by means of a hook member 38 to an intermediate part of the cable 19. Thus, when the platform 9 is depressed and the cable is pulled downwardly through the column 2, the arm 37 is rocked downwardly and the counter registers the operation of the scale.

While it will be apparent that the illustrated embodiment of my invention herein illustrated is well calculated to adequately fulfill the objects primarily stated, it is to be understood that the invention is susceptible to variation, modification and change within the spirit and scope of the subjoined claims.

Having described my invention, I claim:

1. In a device of the class described, in combination, weighing mechanism, a platform supported thereon and independently movable relatively thereto, a movable advertising device, and means operated by movement of said platform relative to said weighing mechanism for moving said advertising device.

2. In a device of the class described, in combination, weighing mechanism, a platform spider supported thereby, a platform supported on said spider and movable relatively thereto, an advertising device, and means operated by movement of said platform relative to said spider for operating said advertising device.

3. In a device of the class described, in combination, weighing mechanism, a platform independently movable relatively thereto, a pivoted member movable by movement of said platform, a movable advertising device, and a cable connected to said pivoted member and said advertising device.

4. In a device of the class described, in combination, weighing mechanism, a platform supported thereby and independently movable relatively thereto, a counter, and means for operating said counter upon movement of said platform.

5. In a device of the class described, in combination, weighing mechanism, a platform supported thereby and independently movable relatively thereto, a counter, a cable attached to said counter, and means operated by movement of said platform relative to said weighing mechanism to pull said cable.

6. In a device of the class described, in combination, weighing mechanism, a platform supported thereby and independently movable relatively thereto, an advertising device, a counter, and means operated by movement of said platform to operate said advertising device and said counter.

7. In a device of the class described, in combination, a weighing platform, an advertising device, a counter, a cable connected to said advertising device and said counter, and means operated by placing a load on said platform to pull said cable and thereby operating said advertising device and said counter.

SAMUEL G. CRANE.

Witnesses:
C. O. MARSHALL,
C. E. WILCOX.